US008832415B2

(12) United States Patent
Gala et al.

(10) Patent No.: US 8,832,415 B2
(45) Date of Patent: Sep. 9, 2014

(54) MAPPING VIRTUAL ADDRESSES TO DIFFERENT PHYSICAL ADDRESSES FOR VALUE DISAMBIGUATION FOR THREAD MEMORY ACCESS REQUESTS

(75) Inventors: Alan Gala, Mount Kisco, NY (US); Martin Ohmacht, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 745 days.

(21) Appl. No.: 12/984,329

(22) Filed: Jan. 4, 2011

(65) Prior Publication Data

US 2011/0208894 A1    Aug. 25, 2011

Related U.S. Application Data

(60) Provisional application No. 61/295,669, filed on Jan. 15, 2010.

(51) Int. Cl.
*G06F 13/00* (2006.01)

(52) U.S. Cl.
USPC ........... 712/207; 712/206; 718/107; 711/119; 711/121; 711/122; 711/137; 711/202; 711/204; 711/206; 711/210

(58) Field of Classification Search
CPC ....... G06F 9/38; G06F 9/3851; G06F 9/3885; G06F 9/30047; G06F 12/0811; G06F 12/0842; G06F 12/0848; G06F 12/0862; G06F 12/10
USPC .......... 712/205, 206, 207; 718/107; 711/118, 711/130, 137, 202, 204, 206, 210, 109, 121, 711/122
See application file for complete search history.

(56) References Cited

U.S. PATENT DOCUMENTS

| | | | |
|---|---|---|---|
| 5,895,492 A | 4/1999 | Greenspan et al. |
| 6,212,605 B1 | 4/2001 | Arimilli et al. |
| 6,347,360 B1 | 2/2002 | Moudgal et al. |
| 6,356,983 B1 | 3/2002 | Parks |
| 6,460,130 B1 | 10/2002 | Trull et al. |

(Continued)

OTHER PUBLICATIONS

Office Action dated Nov. 26, 2012 received in a related U.S. Appl. No. 13/008,546.

(Continued)

*Primary Examiner* — Hong Kim
(74) *Attorney, Agent, or Firm* — Scully, Scott, Murphy & Presser, P.C.; Daniel P. Morris, Esq.

(57) ABSTRACT

A multiprocessor system includes nodes. Each node includes a data path that includes a core, a TLB, and a first level cache implementing disambiguation. The system also includes at least one second level cache and a main memory. For thread memory access requests, the core uses an address associated with an instruction format of the core. The first level cache uses an address format related to the size of the main memory plus an offset corresponding to hardware thread meta data. The second level cache uses a physical main memory address plus software thread meta data to store the memory access request. The second level cache accesses the main memory using the physical address with neither the offset nor the thread meta data after resolving speculation. In short, this system includes mapping of a virtual address to a different physical addresses for value disambiguation for different threads.

14 Claims, 9 Drawing Sheets

(56) References Cited

U.S. PATENT DOCUMENTS

| | | | |
|---|---|---|---|
| 8,205,067 B2 * | 6/2012 | Kriegel et al. | 712/228 |
| 2002/0083297 A1 | 6/2002 | Modelski et al. | |
| 2002/0133672 A1 | 9/2002 | Van De Waerdt et al. | |
| 2003/0014597 A1 | 1/2003 | van de Waerdt | |
| 2004/0193845 A1 | 9/2004 | Thimmannagari et al. | |
| 2005/0204119 A1 | 9/2005 | Saha | |
| 2006/0095680 A1 | 5/2006 | Park et al. | |
| 2006/0143390 A1 * | 6/2006 | Kottapalli | 711/130 |
| 2006/0161740 A1 * | 7/2006 | Kottapalli et al. | 711/152 |
| 2006/0161919 A1 | 7/2006 | Onufryk et al. | |
| 2007/0028021 A1 | 2/2007 | Gaskins | |
| 2007/0067573 A1 * | 3/2007 | Bruening et al. | 711/125 |
| 2007/0168619 A1 | 7/2007 | Hutton et al. | |
| 2007/0192540 A1 | 8/2007 | Gara et al. | |
| 2007/0294481 A1 | 12/2007 | Hoover et al. | |
| 2008/0195820 A1 | 8/2008 | Lais et al. | |
| 2008/0263339 A1 * | 10/2008 | Kriegel et al. | 712/228 |
| 2008/0307169 A1 | 12/2008 | Averill et al. | |
| 2008/0313437 A1 | 12/2008 | Gschwind | |
| 2009/0031310 A1 | 1/2009 | Lev et al. | |
| 2009/0083488 A1 | 3/2009 | Madriles Gimeno et al. | |
| 2009/0235262 A1 | 9/2009 | Ceze et al. | |
| 2009/0268736 A1 | 10/2009 | Allison et al. | |
| 2009/0276581 A1 | 11/2009 | Moga et al. | |
| 2010/0169577 A1 | 7/2010 | Kiyota | |
| 2010/0205609 A1 | 8/2010 | Cypher | |
| 2010/0235580 A1 * | 9/2010 | Bouvier | 711/129 |
| 2010/0235598 A1 * | 9/2010 | Bouvier | 711/163 |
| 2010/0332765 A1 | 12/2010 | Cypher | |
| 2011/0066811 A1 | 3/2011 | Sander et al. | |
| 2011/0145501 A1 * | 6/2011 | Steely et al. | 711/121 |
| 2011/0231612 A1 * | 9/2011 | Karlsson et al. | 711/119 |

OTHER PUBLICATIONS

Notice of Allowance dated May 7, 2013 received in a related U.S. Appl. No. 12/984,252.

Office Action dated Apr. 3, 2013 received in a related U.S. Appl. No. 13/008,546.

Office Action dated Apr. 15, 2013 received in a related U.S. Appl. No. 13/008,583.

Office Action dated Sep. 6, 2013, received in a related U.S. Appl. No. 13/008,546.

* cited by examiner

US 8,832,415 B2

MAPPING VIRTUAL ADDRESSES TO DIFFERENT PHYSICAL ADDRESSES FOR VALUE DISAMBIGUATION FOR THREAD MEMORY ACCESS REQUESTS

GOVERNMENT CONTRACT

This invention was made with Government support under Contract No.: B554331 awarded by Department of Energy. The Government has certain rights in this invention.

CROSS-REFERENCE TO RELATED APPLICATIONS

The present application is being filed concurrently with Ser. No. 12/984,308, which is incorporated by reference.

The present invention relates to the following references which are also incorporated by reference: U.S. patent application Ser. No. 12/796,411 filed Jun. 8, 2010; U.S. Pat. No. 8,103,910 issued Jan. 24, 2012; U.S. patent application Ser. No. 12/984,308, filed Jan. 4, 2011; U.S. Pat. No. 8,533,399 issued Sep. 10, 2013; U.S. Pat. No. 8,275,954, issued Sep. 25, 2012; U.S. Pat. No. 8,275,964, issued Sep. 25, 2012; U.S. patent application Ser. No. 12/684,190, filed Jan. 8, 2010; U.S. Pat. No. 8,468,275, issued Jun. 18, 2013; U.S. Pat. No. 8,347,001, issued Jan. 1, 2013; U.S. patent application Ser. No. 12/697,799 filed Feb. 1, 2010; U.S. Pat. No. 8,595,389, issued Nov. 26, 2013; U.S. Pat. No. 8,447,960, issued May 21, 2013; U.S. Pat. No. 8,268,389, issued Sep. 18, 2012; U.S. Pat. No. 8,359,404, issued Jan. 22, 2013; U.S. patent application Ser. No. 12/684,852, filed Jan. 8, 2010; U.S. Pat. No. 8,429,377, issued Apr. 23, 2013; U.S. Pat. No. 8,356,122, issued Jan. 15, 2013; U.S. provisional patent application serial No. 8,473,683, issued Jun. 25, 2013; U.S. Pat. No. 8,458,267, issued Jun. 4, 2013; U.S. Pat. No. 8,086,766, issued Dec. 27, 2011; U.S. Pat. No. 8,571,834, issued Oct. 29, 2013; U.S. patent application Ser. No. 12/684,776, filed Jan. 8, 2010; U.S. Pat. No. 8,255,633, Aug. 28, 2012; U.S. Pat. No. 8,347,039, issued Jan. 1, 2013; U.S. Pat. No. 8,595,554, issued Nov. 26, 2013; U.S. Pat. No. 8,359,367, issued Jan. 22, 2013; U.S. Pat. No. 8,327,077, issued Dec. 4, 2012; U.S. Pat. No. 8,364,844, issued Jan. 29, 2013; U.S. Pat. No. 8,549,363, issued Oct. 1, 2013; U.S. Pat. No. 8,571,847, issued Oct. 29, 2013; U.S. patent application Ser. No. 12/697,043 filed Jan. 29, 2010; U.S. patent application Ser. No. 12/697,175, Jan. 29, 2010; U.S. Pat. No. 8,370,551, issued Feb. 5, 2013; U.S. Pat. No. 8,312,193, issued Nov. 13, 2012; U.S. Pat. No. 8,521,990, issued Aug. 27, 2013; U.S. Pat. No. 8,412,974, issued Apr. 2, 2013; U.S. patent application Ser. No. 12/696,817 filed Jan. 29, 2010; U.S. Pat. No. 8,527,740, issued Sep. 3, 2013; U.S. patent application Ser. No. 12/796,411, filed Jun. 8, 2010; and, U.S. patent application Ser. No. 12/796,389, filed Jun. 8, 2010.

BACKGROUND

The invention relates to management of speculation in a multiprocessor system, and in particular to cache addressing in this context.

Prior multiprocessor systems have introduced the idea of executing software threads in parallel. Sometimes the individual core processors of a multiprocessor system have had actual circuitry supporting thread level execution. Such circuitry is called hardware threading. The following document relates to the concept of simultaneous multithreading, i.e., more than one thread per core:

Tullsen, D. M., Eggers, S. J., and Levy, H. M. 1995, "Simultaneous multithreading: maximizing on-chip parallelism," in Proceedings of the 22$^{nd}$ Annual international Symposium on Computer Architecture (S. Margherita Ligure, Italy, Jun. 22-24, 1995). ISCA '95. ACM, New York, N.Y., 392-403, DOI=http://doi.acm.org/10.1145/223982.224449

Multithreading allows a program to be broken up into segments that are known to be independent and to execute them in concurrently by multiple hardware threads. Also, for known dependencies, segments can be executed overlapped with synchronization honoring the dependencies.

The state of the art approach to executing threads speculatively allows segments with dependencies not known at compile time to be executed concurrently, with hardware tracking and insuring compliance with potential dependencies. This approach involves keeping track of thread meta data in the core and storing the results of speculative execution in main memory, under control of the core, until speculation was resolved. After speculation was resolved, speculative results would either become committed or be deleted. This approach requires core modules that are customized to the particular parallel processing system. Accordingly, for each new generation of parallel processing system, a new core has to be researched and developed.

SUMMARY

This application arose in the course of development of a new generation of the IBM® BluGene® system. This new generation included several concepts, such as managing speculation in the L2 cache, improving energy efficiency, and using generic cores that conform to the PowerPC architecture usable in other systems such as PCs; however, the invention need not be limited to this context.

An addressing scheme can allow generic cores to be used for a new generation of parallel processing system, thus reducing research, development and production costs. Also creating a system in which prefetch units and L1D caches are shared by hardware threads within a core is energy and floor plan efficient.

In one embodiment, a method comprises:
  in at least one core processor, running a plurality of software threads on respective hardware threads, each hardware thread generating memory access requests using a first addressing scheme that ignores the other hardware threads; and
  in a prefetch unit and/or cache, using addresses relating to the memory requests according to a second addressing scheme that is responsive to the first addressing scheme and identification of which hardware thread generated a given request.

In another embodiment, a method includes:
in at least one core processor, generating at least one memory access request responsive to a hardware thread, using a first addressing scheme;
in a TLB, converting the first addressing scheme to a second addressing scheme;
in an L1 cache and/or prefetch unit,
  accessing cache lines for more than one hardware thread responsive to the second addressing scheme; and
  converting the second addressing scheme to a third addressing scheme responsive to a hardware thread number;
in a second cache, managing memory access requests responsive to the third addressing scheme and a speculation identification number;

creating a fourth addressing scheme for accessing main memory; and accessing main memory responsive to the fourth addressing scheme.

In yet another embodiment an apparatus includes:

a core processor comprising a plurality of hardware threads and using a first addressing scheme; and a prefetch unit and/or cache, shared by the hardware threads and using a second addressing scheme such that two distinct hardware threads use distinct memory locations within the prefetch unit and/or cache for a same address within the first addressing scheme.

In a further embodiment of a method of running software threads in parallel on a multiprocessor system the system comprising a plurality of data paths, each data path comprising at least one core and at least one cache the method includes using at least one first addressing scheme within at least one of the data paths, the first addressing scheme not being responsive to a software thread identification; and generating a second addressing scheme at an exit of the one data path, the second addressing scheme being responsive to the software thread identification.

Objects and advantages will be apparent in the following.

BRIEF DESCRIPTION OF DRAWING

Embodiments will now be described by way of non-limiting example with reference to the following figures.

DETAILED DESCRIPTION

Figure 1:
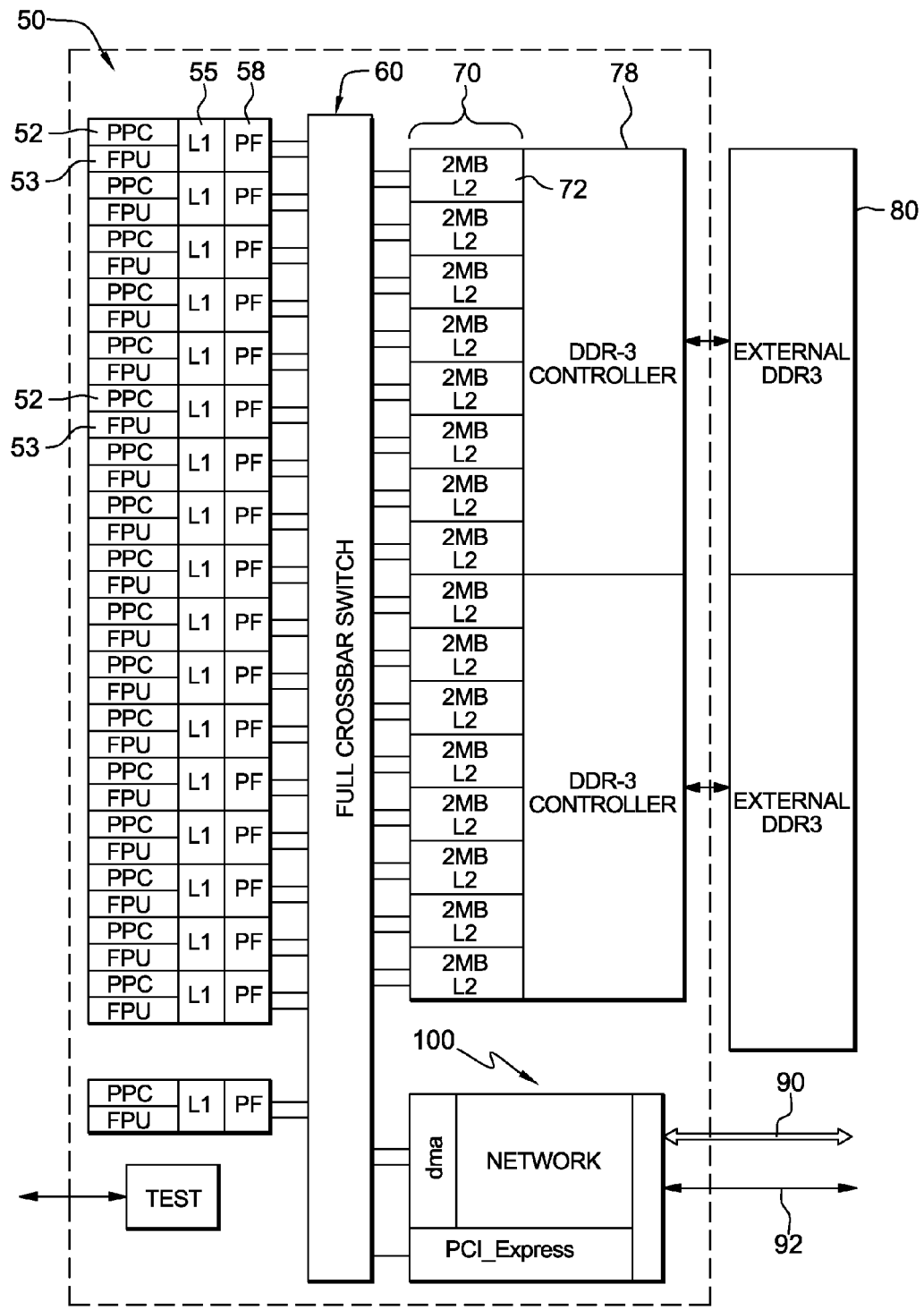
FIG. 1 shows an overview of a nodechip within which caching improvements are implemented.

As described herein, the use of the letter "B"—other than as part of a figure number—represents a Byte quantity, while "GB" represents Gigabyte quantities. Throughout this disclosure a particular embodiment of a multi-processor system will be discussed. This discussion includes various numerical values for numbers of components, bandwidths of interfaces, memory sizes and the like. These numerical values are not intended to be limiting, but only examples. One of ordinary skill in the art might devise other examples as a matter of design choice.

The term "thread" is used herein. A thread can be either a hardware thread or a software thread. A hardware thread within a core processor includes a set of registers and logic for executing a software thread. The software thread is a segment of computer program code. Within a core, a hardware thread will have a thread number. For instance, in the A2, there are four threads, numbered zero through three. Throughout a multiprocessor system, such as the nodechip 50 of FIG. 1, software threads can be referred to using speculation identification numbers ("IDs"). In the present embodiment, there are 128 possible IDs for identifying software threads.

These threads can be the subject of "speculative execution," meaning that a thread or threads can be started as a sort of wager or gamble, without knowledge of whether the thread can complete successfully. A given thread cannot complete successfully if some other thread modifies the data that the given thread is using in such a way as to invalidate the given thread's results. The terms "speculative," "speculatively," "execute," and "execution" are terms of art in this context. These terms do not imply that any mental step or manual operation is occurring. All operations or steps described herein are to be understood as occurring in an automated fashion under control of computer hardware or software.

If speculation fails, the results must be invalidated and the thread must be re-run or some other workaround found.

Three modes of speculative execution are to be supported: Speculative Execution (SE) (also referred to as Thread Level Speculation ("TLS")), Transactional Memory ("TM"), and Rollback.

SE is used to parallelize programs that have been written as sequential program. When the programmer writes this sequential program, she may insert commands to delimit sections to be executed concurrently. The compiler can recognize these sections and attempt to run them speculatively in parallel, detecting and correcting violations of sequential semantics When referring to threads in the context of Speculative Execution, the terms older/younger or earlier/later refer to their relative program order (not the time they actually run on the hardware).

In Speculative Execution, successive sections of sequential code are assigned to hardware threads to run simultaneously. Each thread has the illusion of performing its task in program order. It sees its own writes and writes that occurred earlier in the program. It does not see writes that take place later in program order even if (because of the concurrent execution) these writes have actually taken place earlier in time.

To sustain the illusion, the L2 gives threads private storage as needed, accessible by software thread ID. It lets threads read their own writes and writes from threads earlier in program order, but isolates their reads from threads later in program order. Thus, the L2 might have several different data values for a single address. Each occupies an L2 way, and the L2 directory records, in addition to the usual directory information, a history of which thread IDs are associated with reads and writes of a line. A speculative write is not to be written out to main memory.

One situation that will break the program-order illusion is if a thread earlier in program order writes to an address that a thread later in program order has already read. The later thread should have read that data, but did not. The solution is to kill the later software thread and invalidate all the lines it has written in L2, and to repeat this for all younger threads. On the other hand, without such interference a thread can complete successfully, and its writes can move to external main memory when the line is cast out or flushed.

Not all threads need to be speculative. The running thread earliest in program order can be non-speculative and run conventionally; in particular its writes can go to external main memory. The threads later in program order are speculative and are subject to be killed. When the non-speculative thread completes, the next-oldest thread can be committed and it then starts to run non-speculatively.

The following sections describe the implementation of the speculation model in the context of addressing.

When a sequential program is decomposed into speculative tasks, the memory subsystem needs to be able to associate all memory requests with the corresponding task. This is done by assigning a unique ID at the start of a speculative task to the thread executing the task and attaching the ID as tag to all its requests sent to the memory subsystem.

As the number of dynamic tasks can be very large, it may not be practical to guarantee uniqueness of IDs across the entire program run. It is sufficient to guarantee uniqueness for all IDs concurrently present in the memory system. More about the use of speculation ID's, including how they are allocated, committed, and invalidated, appears in the incorporated applications.

Transactions as defined for TM occur in response to a specific programmer request within a parallel program. Generally the programmer will put instructions in a program delimiting sections in which TM is desired. This may be done by marking the sections as requiring atomic execution. According to the PowerPC architecture: "An access is single-copy atomic, or simply "atomic", if it is always performed in its entirety with no visible fragmentation".

To enable a TM runtime system to use the TM supporting hardware, it needs to allocate a fraction of the hardware resources, particularly the speculation IDs that allow hardware to distinguish concurrently executed transactions, from the kernel (operating system), which acts as a manager of the hardware resources. The kernel configures the hardware to group IDs into sets called domains, configures each domain for its intended use, TLS, TM or Rollback, and assigns the domains to runtime system instances.

At the start of each transaction, the runtime system executes a function that allocates an ID from its domain, and programs it into a register that starts marking memory access as to be treated as speculative, i.e., revocable if necessary.

When the transaction section ends, the program will make another call that ultimately signals the hardware to do conflict checking and reporting. Based on the outcome of the check, all speculative accesses of the preceding section can be made permanent or removed from the system.

The PowerPC architecture defines an instruction pair known as larx/stcx. This instruction type can be viewed as a special case of TM. The larx/stcx pair will delimit a memory access request to a single address and set up a program section that ends with a request to check whether the instruction pair accessed the memory location without interfering access from another thread. If an access interfered, the memory modifying component of the pair is nullified and the thread is notified of the conflict. More about a special implementation of larx/stcx instructions using reservation registers is to be found in co-pending application Ser. No. 12/697,799 filed Jan. 29, 2010, which is incorporated herein by reference. This special implementation uses an alternative approach to TM to implement these instructions. In any case, TM is a broader concept than larx/stcx. A TM section can delimit multiple loads and stores to multiple memory locations in any sequence, requesting a check on their success or failure and a reversal of their effects upon failure.

Rollback occurs in response to "soft errors", temporary changes in state of a logic circuit. Normally these errors occur in response to cosmic rays or alpha particles from solder balls. The memory changes caused by a programs section executed speculatively in rollback mode can be reverted and the core can, after a register state restore, replay the failed section.

Referring now to FIG. 1, there is shown an overall architecture of a multiprocessor computing node 50 implemented in a parallel computing system in which the present embodiment may be implemented. The compute node 50 is a single chip ("nodechip") based on PowerPC cores, though the architecture can use any cores, and may comprise one or more semiconductor chips.

More particularly, the basic nodechip 50 of the multiprocessor system illustrated in FIG. 1 includes (sixteen or seventeen) 16+1 symmetric multiprocessing (SMP) cores 52, each core being 4-way hardware threaded supporting transactional memory and thread level speculation, and, including a Quad Floating Point Unit (FPU) 53 associated with each core. The 16 cores 52 do the computational work for application programs.

The $17^{th}$ core is configurable to carry out system tasks, such as reacting to network interface service interrupts, distributing network packets to other cores;
    taking timer interrupts
    reacting to correctable error interrupts,
    taking statistics
    initiating preventive measures
    monitoring environmental status (temperature), throttle system accordingly.

In other words, it offloads all the administrative tasks from the other cores to reduce the context switching overhead for these.

In one embodiment, there is provided 32 MB of shared L2 cache 70, accessible via crossbar switch 60. There is further provided external Double Data Rate Synchronous Dynamic Random Access Memory ("DDR SDRAM") 80, as a lower level in the memory hierarchy in communication with the L2. Herein, "low" and "high" with respect to memory will be taken to refer to a data flow from a processor to a main memory, with the processor being upstream or "high" and the main memory being downstream or "low."

Each FPU 53 associated with a core 52 has a data path to the L1-cache 55 of the CORE, allowing it to load or store from or into the L1-cache 55. The terms "L1" and "L1D" will both be used herein to refer to the L1 data cache.

Figure 3:
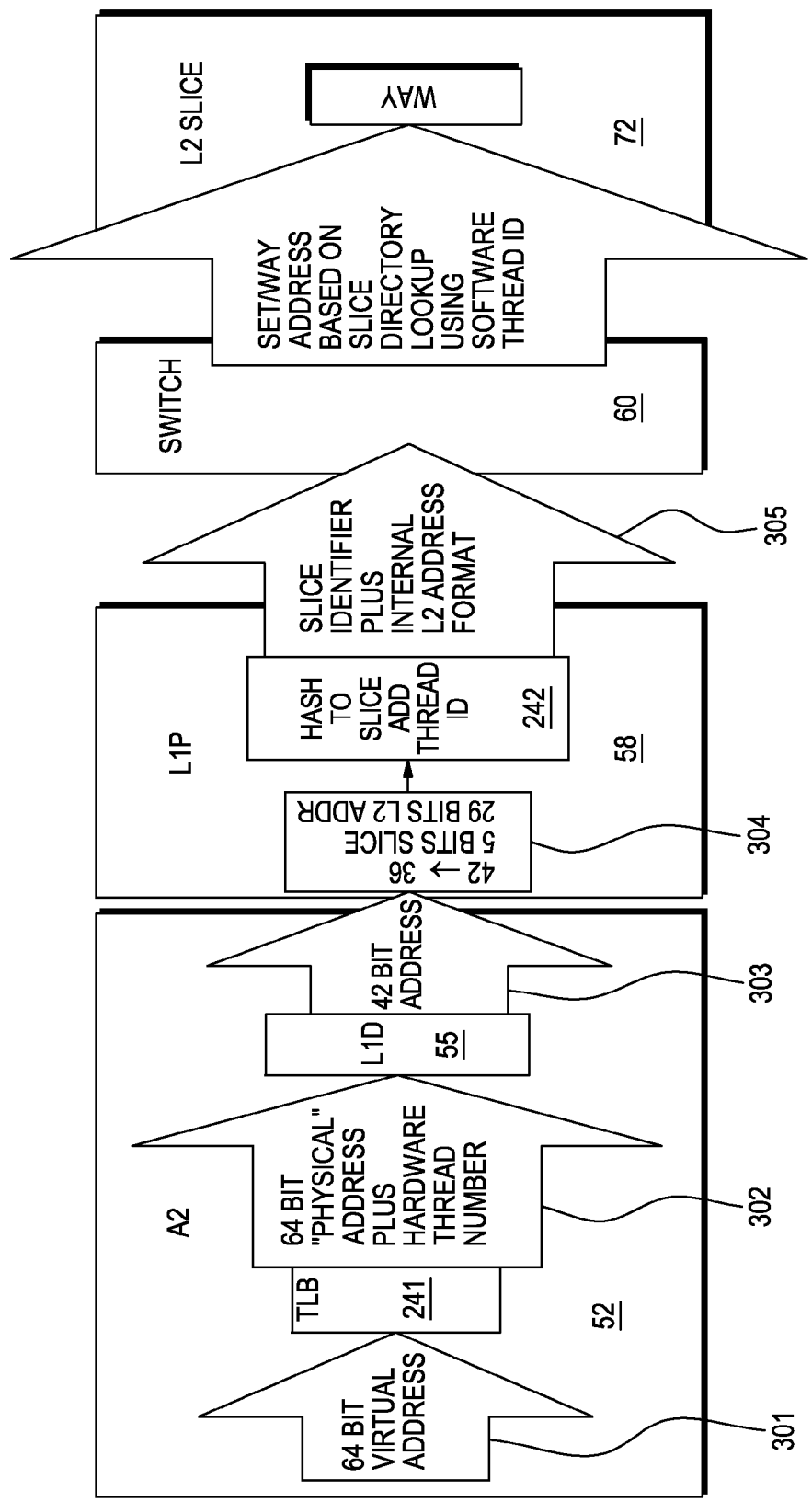
FIG. 3 is a conceptual diagram showing different address representations at different points in a communications pathway.
Figure 4:
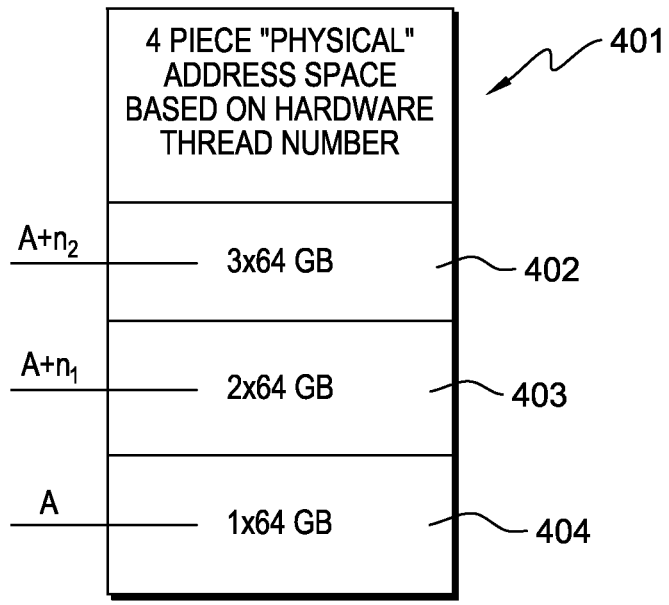
FIG. 4 shows a four piece "physical" address space used by the L1D cache.
Figure 9:
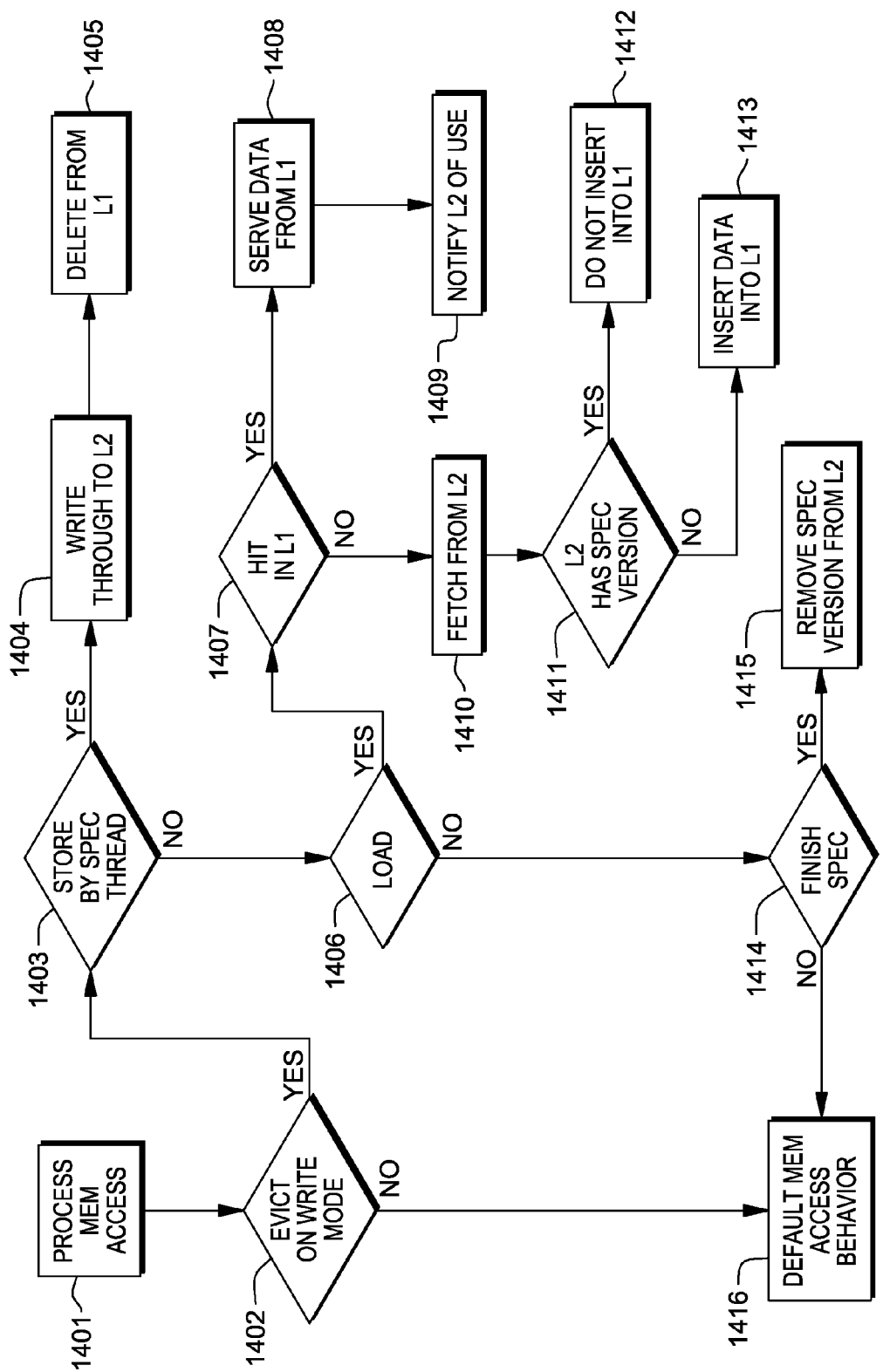
FIG. 9 shows a flowchart of a method for using the embodiment of FIG. 8.

Each core 52 is directly connected to a supplementary processing agglomeration 58, which includes a private prefetch unit. For convenience, this agglomeration 58 will be referred to herein as "L1P"—meaning level 1 prefetch—or "prefetch unit;" but many additional functions are lumped together in this so-called prefetch unit, such as write combining. These additional functions could be illustrated as separate modules, but as a matter of drawing and nomenclature convenience the additional functions and the prefetch unit will be grouped together. This is a matter of drawing organization, not of substance. Some of the additional processing power of this L1P group is shown in FIGS. 3,4 and 9. The L1P group also accepts, decodes and dispatches all requests sent out by the core 52.

By implementing a direct memory access ("DMA") engine referred to herein as a Messaging Unit ("MU") such as MU 100, with each MU including a DMA engine and Network Card interface in communication with the XBAR switch, chip I/O functionality is provided. In one embodiment, the compute node further includes: intra-rack interprocessor links 90 which may be configurable as a 5-D torus; and, one I/O link 92 interfaced with the interfaced with the MU. The system node employs or is associated and interfaced with a 8-16 GB memory/node, also referred to herein as "main memory."

The term "multiprocessor system" is used herein. With respect to the present embodiment this term can refer to a nodechip or it can refer to a plurality of nodechips linked together. In the present embodiment, however, the management of speculation is conducted independently for each nodechip. This might not be true for other embodiments, without taking those embodiments outside the scope of the claims.

The compute nodechip implements a direct memory access engine DMA to offload the network interface. It transfers blocks via three switch master ports between the L2-cache slices 70 (FIG. 1). It is controlled by the cores via memory mapped I/O access through an additional switch slave port. There are 16 individual slices, each of which is assigned to store a distinct subset of the physical memory lines. The actual physical memory addresses assigned to each cache slice are configurable, but static. The L2 has a line size such as 128 bytes. In the commercial embodiment this will be twice the width of an L1 line. L2 slices are set-associative, organized as 1024 sets, each with 16 ways. The L2 data store may be composed of embedded DRAM and the tag store may be composed of static RAM.

The L2 has ports, for instance a 256b wide read data port, a 128b wide write data port, and a request port. Ports may be shared by all processors through the crossbar switch 60.

In this embodiment, the L2 Cache units provide the bulk of the memory system caching on the BQC chip. Main memory may be accessed through two on-chip DDR-3 SDRAM memory controllers 78, each of which services eight L2 slices.

The L2 slices may operate as set-associative caches while also supporting additional functions, such as memory speculation for Speculative Execution (SE), which includes different modes such as: Thread Level Speculations ("TLS"), Transactional Memory ("TM") and local memory rollback, as well as atomic memory transactions.

The L2 serves as the point of coherence for all processors. This function includes generating L1 invalidations when necessary. Because the L2 cache is inclusive of the L1s, it can remember which processors could possibly have a valid copy of every line, and slices can multicast selective invalidations to such processors.

Figure 2:
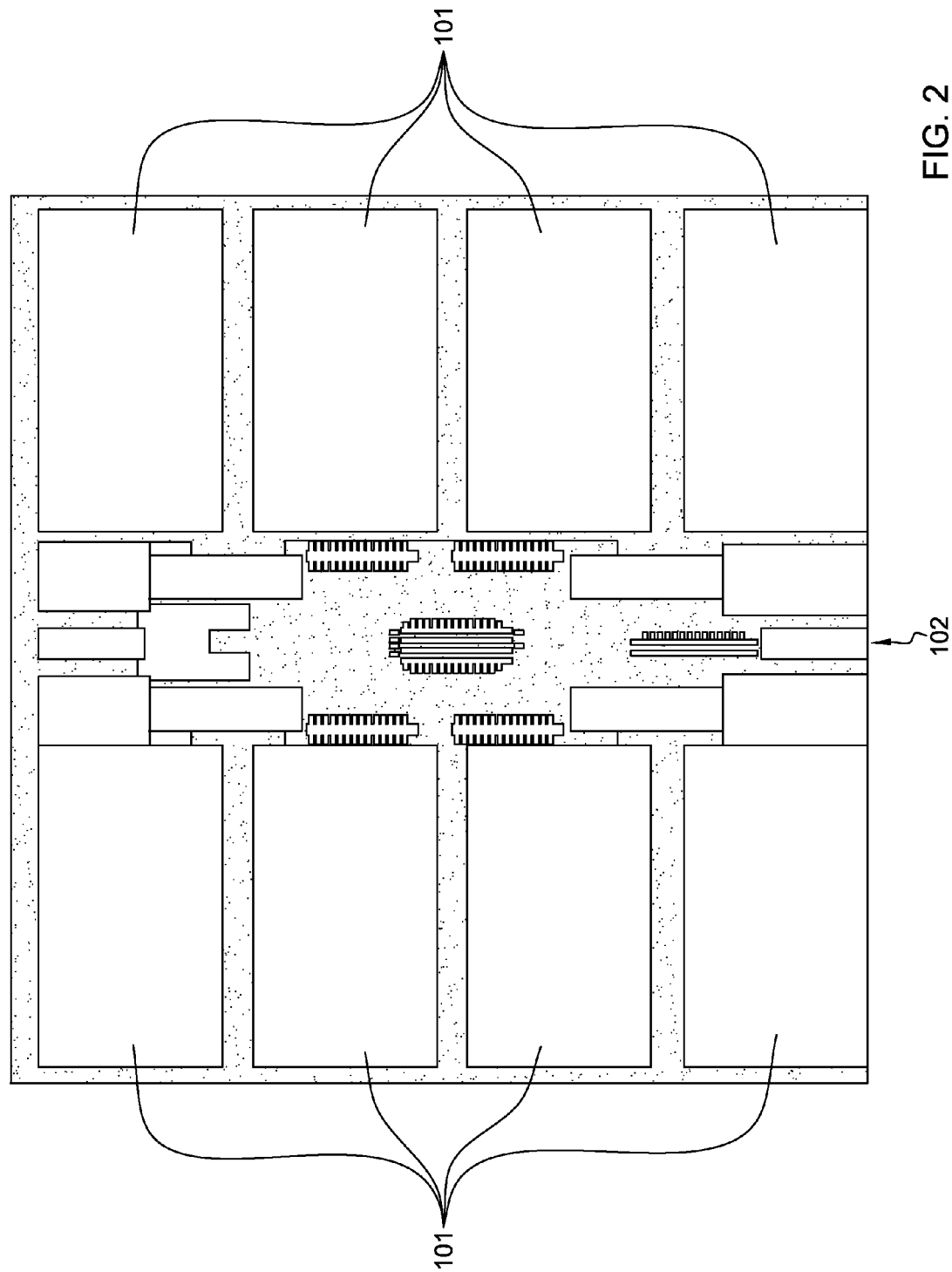
FIG. 2 shows a map of a cache slice.

FIG. 2 shows a cache slice. It includes arrays of data storage 101, and a central control portion 102.

Figure 6:
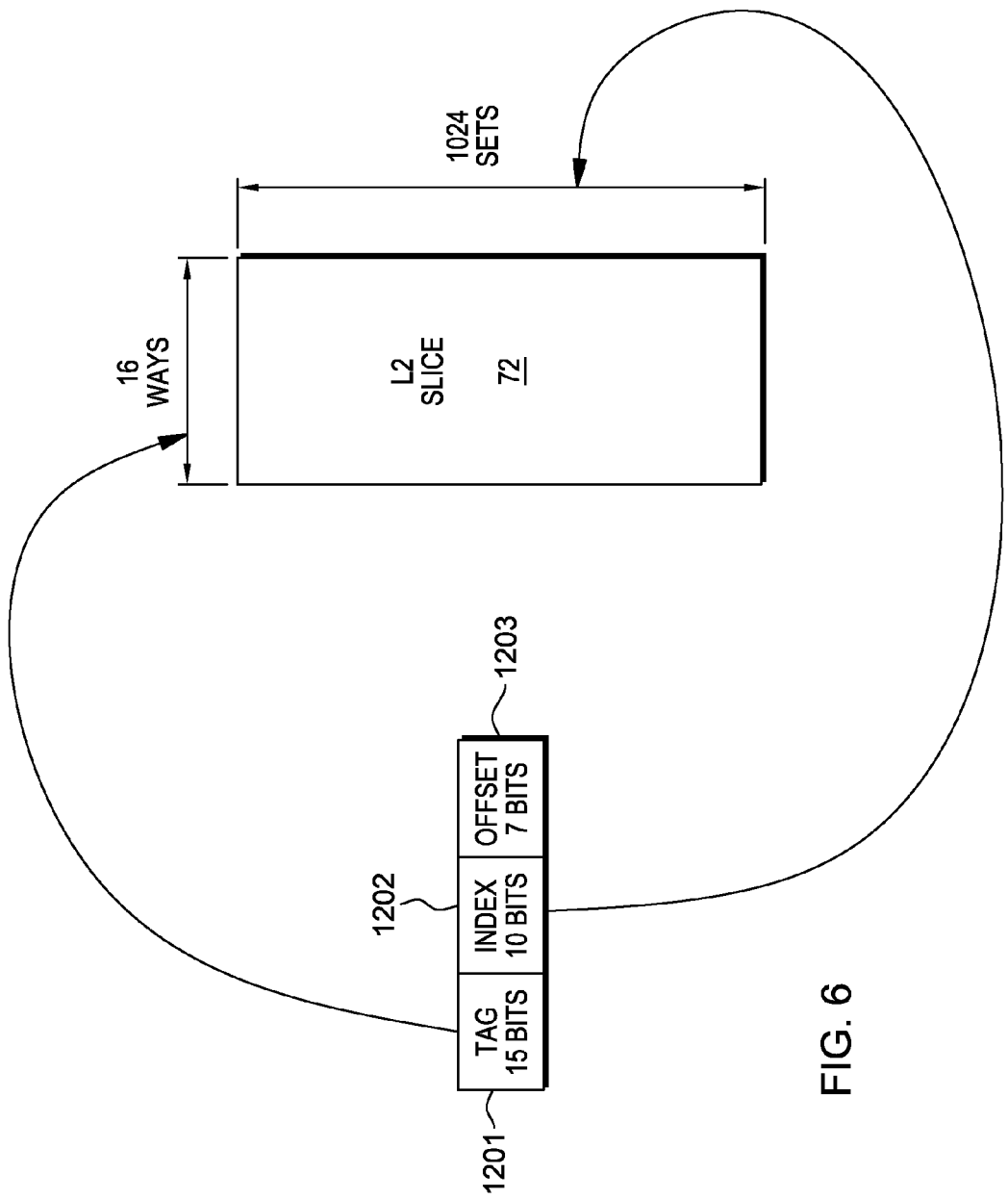
FIG. 6 shows address formatting used by the switch to locate the slice.

FIG. 3 shows various address versions across a memory pathway in the nodechip 50. One embodiment of the core 52 uses a 64 bit virtual address 301 in accordance with the PowerPC architecture. In the TLB 241, that address is converted to a 42 bit "physical" address 302 that actually corresponds to 64 times the architected maximum main memory size 80, so it includes extra bits that can be used for thread identification information. The address portion used to address a location within main memory will have the canonical format of FIG. 6, prior to hashing, with a tag 1201 that matches the address tag field of a way, an index 1202 that corresponds to a set, and an offset 1203 that corresponds to a location within a line. The addressing varieties shown, with respect to the commercial embodiment, are intended to be used for the data pathway of the cores. The instruction pathway is not shown here. The "physical" address is used in the L1D 55. After arriving at the L1P, the address is stripped down to 36 bits for addressing of main memory at 304.

Figure 7:
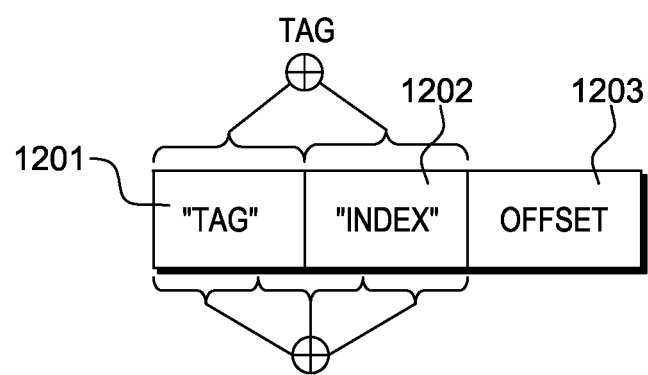
FIG. 7 shows an address format.

Address scrambling per FIG. 7 tries to distribute memory accesses across L2-cache slices and within L2-cache slices across sets (congruence classes). Assuming a 64 GB main memory address space, a physical address dispatched to the L2 has 36 bits, numbered from 0 (MSb) to 35 (LSb) (a(0 to 35)).

The L2 stores data in 128 B wide lines, and each of these lines is located in a single L2-slice and is referenced there via a single directory entry. As a consequence, the address bits 29 to 35 only reference parts of an L2 line and do not participate in L2 slice or set selection.

To evenly distribute accesses across L2-slices for sequential lines as well as larger strides, the remaining address bits 0-28 are hashed to determine the target slice. To allow flexible configurations, individual address bits can be selected to determine the slice as well as an XOR hash on an address can be used: The following hashing is used at 242 in the present embodiment:

L2 slice:=('0000' & a(0)) xor a(1 to 4) xor a(5 to 8) xor a(9 to 12) xor a(13 to 16) xor a(17 to 20) xor a(21 to 24) xor a(25 to 28)

For each of the slices, 25 address bits are a sufficient reference to distinguish L2 cache lines mapped to that slice.

Each L2 slice holds 2 MB of data or 16K cache lines. At 16-way associativity, the slice has to provide 1024 sets, addressed via 10 address bits. The different ways are used to store different addresses mapping to the same set as well as for speculative results associated with different threads or combinations of threads.

Again, even distribution across set indices for unit and non-unit strides is achieved via hashing, to with:

Set index:=("00000" & a(0 to 4)) xor a(5 to 14) xor a(15 to 24).

To uniquely identify a line within the set, using a(0 to 14) is sufficient as a tag.

Thereafter, the switch provides addressing to the L2 slice in accordance with an address that includes the set and way and offset within a line, as shown in FIG. 2D. Each line has 16 ways.

Figure 5:
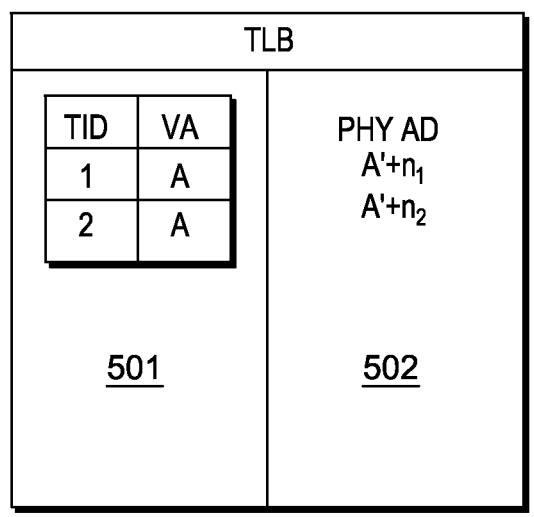
FIG. 5 is a conceptual diagram of operations in a TLB.

FIG. 5 shows the role of the Translation Look-aside Buffers (TLB) 241 in the address mapping process. The goal of the mapping process is to isolate each thread's view of the memory state inside the L1D. This is necessary to avoid making speculative memory changes of one thread visible in the L1D to another thread. It is achieved by assigning for a given virtual address different physical addresses to each thread. These addresses differ only in the upper address bits that are not used to distinguish locations within the smaller implemented main memory space. The left column 501 shows a table with a column representing the virtual address matching component of the TLB. It matches the hardware thread ID (TID) of the thread executing the memory access and a column directed to the virtual address, in other words the 64 bit address used by the core. In this case, both thread ID 1 and thread ID 2 are seeking to access a virtual address, A. The right column 502 shows the translation part of the TLB, a "physical address," in other words an address to the four piece address space shown in FIG. 4. In this case, the hardware thread with ID 1 is accessing a "physical address" that includes the main memory address A', corresponding to the virtual address A, plus an offset, $n_1$, indicating the first hardware thread. The hardware thread with ID 2 is accessing the "physical address" that includes the main memory address A' plus an offset, $n_2$, indicating the second hardware thread. Not only does the TLB keep track of a main memory address A', which is provided by a thread, but it also keeps track of a thread number (0, $n_1$, $n_2$, $n_3$). This table happens to show two threads accessing the same main memory address A' at the same time, but that need not be the case. The hardware thread number—as opposed to the thread ID—combined with the address A', will be treated by the L1P as addresses of a four piece "address space" as shown in FIG. 4. This is not to say that the L1P is actually maintaining 256 GB of memory, which would be four times the main memory size. This address space is the conceptual result of the addressing scheme. The L1P acts as if it can address that much data in terms of addressing format, but in fact it targets considerably less cache lines than would be necessary to store that much data.

This address space will have at least four pieces, 401, 402, 403, and 404, because the embodiment of the core has four hardware threads. If the core had a different number of hardware threads, there could be a different number of pieces of the address space of the L1P. This address space allows each hardware thread to act as if it is running independently of every other thread and has an entire main memory to itself. The hardware thread number indicates to the L1P, which of the pieces is to be accessed.

Long and Short Running Speculation

The L2 accommodates two types of L1 cache management in response to speculative threads. One is for long running speculation and the other is for short running speculation. The differences between the mode support for long and short running speculation is described in the following two subsections.

For long running transactions mode, the L1 cache needs to be invalidated to make all first accesses to a memory location visible to the L2 as an L1-load-miss. A thread can still cache all data in its L1 and serve subsequent loads from the L1 without notifying the L2 for these. This mode will use address aliasing as shown in FIG. 3, with the four part address space in the L1P, as shown in FIG. 4.

To reduce overhead in short running speculation mode, the requirement to invalidate L1 is eliminated. The invalidation of the L1 allowed tracking of all read locations by guaranteeing at least one L1 miss per accessed cache line. For small transactions, the equivalent is achieved by making all load addresses within the transaction visible to the L2, regardless of L1 hit or miss, i.e. by operating the L1 in "read/write through" mode. In addition, data modified by a speculative thread is in this mode evicted from the L1 cache, serving all loads of speculatively modified data from L2 directly. In this case, the L1 does not have to use a four piece mock space as shown in FIG. 4, since no speculative writes are made to the L1. Instead, it can use a single physical addressing space that corresponds to the addresses of the main memory.

Figure 8:
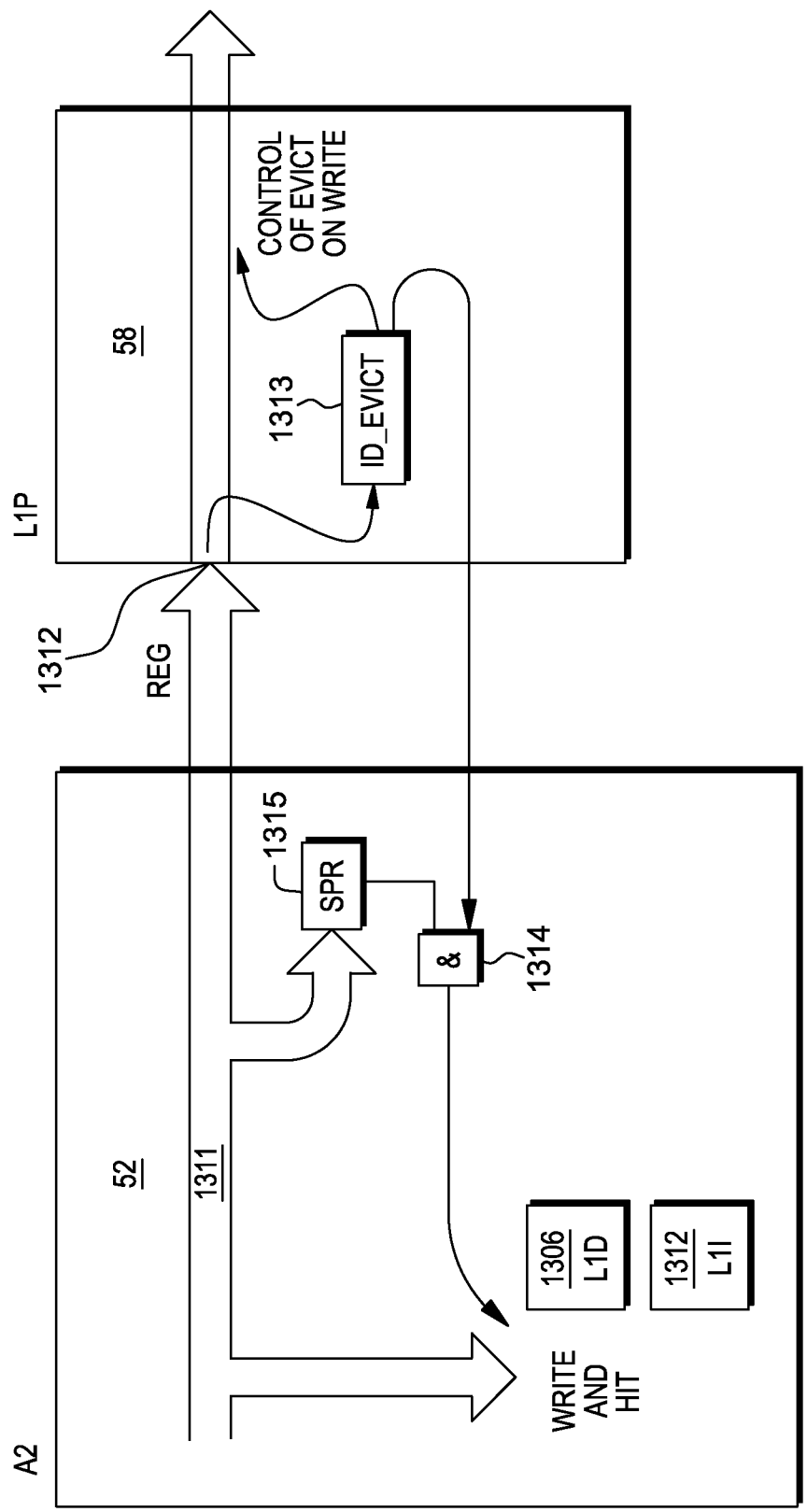
FIG. 8 shows a switch for switching between addressing modes.

FIG. 8 shows a switch for choosing between these addressing modes. The processor 52 chooses—responsive to computer program code produced by a programmer—whether to evict on write for short running speculation or do address aliasing for long-running speculation per FIGS. 3, 4, and 5.

In the case of switching between memory access modes here, a register 1312 at the entry of the L1P receives an address field from the processor 52, as if the processor 52 were requesting a main memory access, i.e., a memory mapped input/output operation (MMIO). The L1P diverts a bit called ID_evict 1313 from the register and forwards it both back to the processor 52 and also to control the L1 caches.

A special purpose register SPR 1315 also takes some data from the path 1311, which is then AND-ed at 1314 to create a signal that informs the L1D 1306, i.e. the data cache whether write on evict is to be enabled. The instruction cache, L1I 1312 is not involved.

FIG. 9 is a flowchart describing operations of the short running speculation embodiment. At 1401, memory access is requested. This access is to be processed responsive to the switching mechanism of FIG. 8. This switch determines whether the memory access is to be in accordance with a mode called "evict on write" or not per 1402.

At 1403, it is determined whether current memory access is responsive to a store by a speculative thread. If so, there will be a write through from L1 to L2 at 1404, but the line will be deleted from the L1 at 1405.

If access is not a store by a speculative thread, there is a test as to whether the access is a load at 1406. If so, the system must determine at 1407 whether there is a hit in the L1. If so, data is served from L1 at 1408 and L2 is notified of the use of the data at 1409.

If there is not a hit, then data must be fetched from L2 at 1410. If L2 has a speculative version per 1411, the data should not be inserted into L1 per 1412. If L2 does not have a speculative version, then the data can be inserted into L1 per 1413.

If the access is not a load, then the system must test whether speculation is finished at 1414. If so, the speculative status should be removed from L2 at 1415.

If speculation is not finished, and none of the other conditions are met, then default memory access behavior occurs at 1416.

A programmer will have to determine whether or not to activate evict on write in response to application specific programming considerations. For instance, if data is to be used frequently, the addressing mechanism of FIG. 3 will likely be advantageous.

Figure 10:
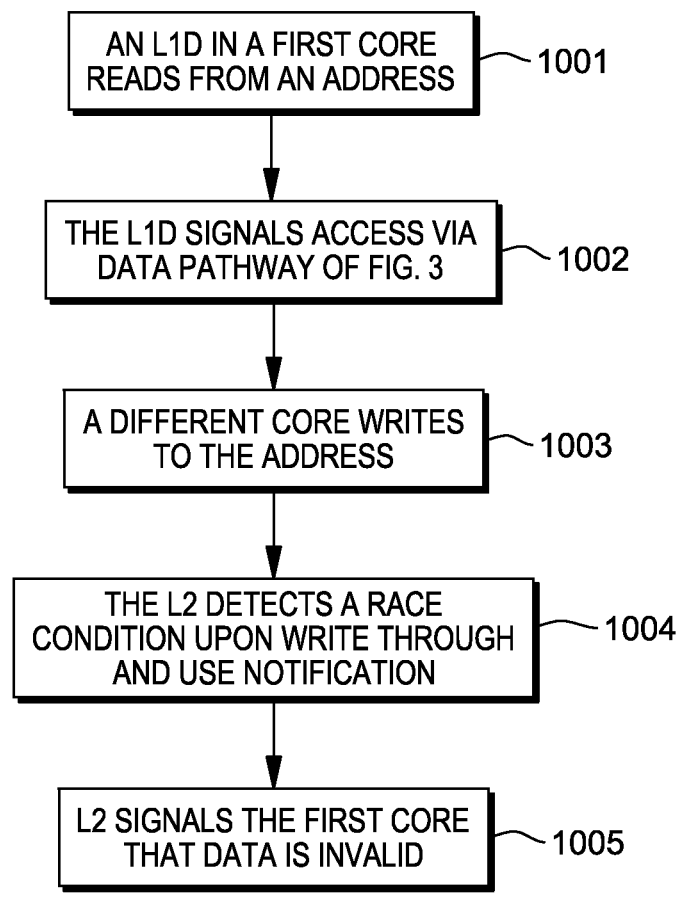
FIG. 10 is a flowchart showing handling of a race condition.

If many small sections of code without frequent data accesses are to be executed in parallel, the mechanism of short running speculation will likely be advantageous. L1/L1P hit race condition FIG. 10 shows a simplified explanation of a race condition. When the L1P prefetches data, this data is not flagged by the L2 as read by the speculative thread. The same is true for any data residing in L1 when entering a transaction in TM.

In case of a hit in L1P or L1 for TM at 1001, a notification for this address is sent to L2 at 1002, flagging the line as speculatively accessed. If a write from another core at 1003 to that address reaches the L2 before the L1/L1P hit notification and the write caused invalidate request has not reached the L1 or L1P before the L1/L1P hit, the core could have used stale data while flagging new data to be read in the L2. The L2 sees the L1/L1P hit arriving after the write at 1004 and cannot deduce directly from the ordering if a race occurred. However, in this case a use notification arrives at the L2 with the coherence bits of the L2 denoting that the core did not have a valid copy of the line, thus indicating a potential violation. To retain functional correctness, the L2 invalidates the affected speculation ID in this case at 1005.

Coherence

A thread starting a long-running speculation always begins with an invalidated L1, so it will not retain stale data from a previous thread's execution. Within a speculative domain, L1 invalidations become unnecessary in some cases:

- A thread later in program order writes to an address read by a thread earlier in program order. It would be unnecessary to invalidate the earlier thread's L1 copy, as this new data will not be visible to that thread.
- A thread earlier in program order writes to an address read by a thread later in program order. Here there are two cases. If the later thread has not read the address yet, it is not yet in the later thread's L1 (all threads start with invalidated L1's), so the read progresses correctly. If the later thread has already read the address, invalidation is unnecessary because the speculation rules require the thread to be killed.

Between speculative domains, the usual multiprocessor coherence rules apply. To support speculation, the L2 routinely records thread IDs associated with reads; on a write, the L2 sends invalidations to all processors outside the domain that are marked as having read that address.

When a line has been established by a speculative thread or a transaction, the rules for enforcing consistency change. When running purely non-speculative, only write accesses change the memory state; in the absence of writes the memory state can be safely assumed to be constant. When a speculatively running thread commits, the memory state as observed by other threads may also change. The memory subsystem does not have the set of memory locations that have been altered by the speculative thread instantly available at the time of commit, thus consistency has to be ensured by means other than sending invalidates for each affected address. This can be accomplished by taking appropriate action when memory writes occur.

Access Size Signaling from the L1/L1p to the L2

Memory write accesses footprints are always precisely delivered to L2 as both L1 as well as L1P operate in write-through.

For reads however, the data requested from the L2 does not always match its actual use by a thread inside the core. However, both the L1 as well as the L1P provide methods to separate the actual use of the data from the amount of data requested from the L2.

The L1 can be configured such that it provides on a read miss not only the 64B line that it is requesting to be delivered, but also the section inside the line that is actually requested by the load instruction triggering the miss. It can also send requests to the L1P for each L1 hit that indicate which section of the line is actually read on each hit. This capability is activated and used for short running speculation. In long running speculation, L1 load hits are not reported and the L2 has to assume that the entire 64B section requested has been actually used by the requesting thread.

The L1P can be configured independently from that to separate L1P prefetch requests from actual L1P data use (HP hits). If activated, L1P prefetches only return data and do not add IDs to speculative reader sets. L1P read hits return data to the core immediately and send to the L2 a request that informs the L2 about the actual use of the thread.

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and run, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The word "comprising", "comprise", or "comprises" as used herein should not be viewed as excluding additional elements. The singular article "a" or "an" as used herein should not be viewed as excluding a plurality of elements. Unless the word "or" is expressly limited to mean only a single item exclusive from other items in reference to a list of at least two items, then the use of "or" in such a list is to be interpreted as including (a) any single item in the list, (b) all of the items in the list, or (c) any combination of the items in the list. Ordinal terms in the claims, such as "first" and "second" are used for distinguishing elements and do not necessarily imply order of operation.

Items illustrated as boxes in flowcharts herein might be implemented as software or hardware as a matter of design choice by the skilled artisan. Software might include sequential or parallel code, including objects and/or modules. Modules might be organized so that functions from more than one conceptual box are spread across more than one module or so that more than one conceptual box is incorporated in a single module. Data and computer program code illustrated as residing on a medium might in fact be distributed over several media, or vice versa, as a matter of design choice. Such media might be of any suitable type, such as magnetic, electronic, solid state, or optical.

Any algorithms given herein can be implemented as computer program code and stored on a machine readable medium, to be performed on at least one processor. Alternatively, they may be implemented as hardware. They are not intended to be executed manually or mentally.

The use of variable names in describing operations in a computer does not preclude the use of other variable names for achieving the same function. Ordinal numbers are used in the claims herein for clarification between elements. These ordinal numbers do not imply order of operation.

The invention claimed is:

1. A method comprising:
   in at least one core processor, generating at least one memory access request responsive to a hardware thread, using a first addressing scheme;
   in a TLB, converting the first addressing scheme to a second addressing scheme;
   in an L1 cache and/or prefetch unit,
      accessing cache lines for more than one hardware thread responsive to the second addressing scheme; and
      converting the second addressing scheme to a third addressing scheme responsive to a hardware thread number;
   in a second cache, managing memory access requests responsive to the third addressing scheme and a speculation identification number;

creating a fourth addressing scheme for accessing main memory; and accessing main memory responsive to the fourth addressing scheme.

2. A method comprising:

in at least one core processor, running a plurality of software threads on respective hardware threads, each hardware thread generating memory access requests using a first addressing scheme that ignores the other hardware threads; and in a prefetch unit and/or cache, using addresses relating to the memory requests according to a second addressing scheme that is responsive to the first addressing scheme and identification of which hardware thread generated a given request, wherein the second addressing scheme establishes a respective distinct address space for each hardware thread.

3. The method of claim 2, comprising, in a TLB, converting the first addressing scheme to an intermediate addressing scheme, wherein the first addressing scheme corresponds to a published standard instruction format and the intermediate addressing scheme relates to a physical memory size of a memory unit in a system that includes the core and prefetch unit.

4. The method of claim 3, wherein the first addressing scheme is a virtual addressing scheme.

5. The method of claim 4, wherein the first addressing scheme is in accordance with the Power PC architecture.

6. The method of claim 3, wherein the second addressing scheme comprises a first number of bits corresponding to a size of main memory and a second number of bits for representing a software thread ID number.

7. The method of claim 2, comprising, for a subsequent level of cache, generating at least one third addressing scheme corresponding to an organization of the subsequent level of cache.

8. The method of claim 7, comprising generating actual main memory accesses in the subsequent level of cache.

9. The method of claim 2, comprising, responsive to completion of a speculative software thread, clearing the prefetch unit.

10. The method of claim 9, comprising reloading a first level cache responsive to any threads that require memory accesses after the first level cache is cleared.

11. A method of running software threads in parallel on a multiprocessor system, the system comprising a plurality of data paths, each data path comprising at least one core and at least one cache, the method comprising using at least one first addressing scheme within at least one of the data paths, the first addressing scheme not being responsive to a software thread identification; and generating a second addressing scheme at an exit of the one data path, the second addressing scheme being responsive to the software thread identification, wherein the second addressing scheme establishes a respective distinct address space for each of a plurality of hardware threads.

12. The method of claim 11, wherein the first addressing scheme creates a physical address space for each software thread, so that at least one element of the data paths is not aware of speculation associated with the software thread identification.

13. The method of claim 12, wherein the second addressing scheme is used within a lower level cache.

14. The method of claim 12, comprising resolving speculation associated with the software identification in the lower level cache; and generating main memory accesses in the lower level cache after speculation is resolved.

* * * * *